(12) United States Patent
Clayton et al.

(10) Patent No.: US 8,917,861 B2
(45) Date of Patent: Dec. 23, 2014

(54) AUTOMATED VOICE CONNECTION TO A BEST-DETERMINED TARGET

(75) Inventors: Mark Clayton, Manorville, NY (US); Lexie Spiro, Astoria, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 154 days.

(21) Appl. No.: 13/488,815

(22) Filed: Jun. 5, 2012

(65) Prior Publication Data
US 2013/0322613 A1 Dec. 5, 2013

(51) Int. Cl.
*H04M 3/00* (2006.01)
*H04M 5/00* (2006.01)

(52) U.S. Cl.
USPC .............................. 379/265.12; 379/265.13

(58) Field of Classification Search
USPC .............. 379/265.02, 265.06, 265.12, 265.13
See application file for complete search history.

(56) References Cited

U.S. PATENT DOCUMENTS

| | | | |
|---|---|---|---|
| 5,949,866 A | 9/1999 | Colera et al. | |
| 6,965,669 B2* | 11/2005 | Bickford et al. | 379/265.07 |
| 7,307,963 B2 | 12/2007 | Chow et al. | |
| 7,738,407 B2 | 6/2010 | Chow et al. | |
| 7,769,149 B2 | 8/2010 | Berkman | |
| 7,787,609 B1* | 8/2010 | Flockhart et al. | 379/265.01 |
| 7,787,896 B2 | 8/2010 | Kundu et al. | |
| 7,948,923 B2 | 5/2011 | Chow et al. | |
| 7,948,954 B1 | 5/2011 | Chow et al. | |
| 8,000,989 B1* | 8/2011 | Kiefhaber et al. | 705/7.12 |
| 8,009,822 B1* | 8/2011 | Boutcher et al. | 379/265.11 |
| 2003/0153343 A1 | 8/2003 | Crockett et al. | |
| 2004/0136507 A1 | 7/2004 | Reynolds | |
| 2005/0043986 A1* | 2/2005 | McConnell et al. | 705/11 |
| 2005/0175160 A1 | 8/2005 | Simpson et al. | |
| 2005/0271195 A1 | 12/2005 | Andrews et al. | |
| 2006/0019698 A1 | 1/2006 | Ahya et al. | |
| 2006/0203993 A1 | 9/2006 | Bussey et al. | |
| 2007/0086584 A1 | 4/2007 | Rossini | |
| 2007/0282703 A1* | 12/2007 | Sharpe et al. | 705/26 |
| 2008/0119165 A1 | 5/2008 | Mittal et al. | |
| 2008/0195507 A1* | 8/2008 | Ratnakar | 705/27 |
| 2009/0279681 A1 | 11/2009 | McKee et al. | |

FOREIGN PATENT DOCUMENTS

| | | |
|---|---|---|
| EP | 1715657 | 10/2006 |
| EP | 1715657 A1 | 10/2006 |
| WO | 2008014407 | 1/2008 |
| WO | 2008014407 A2 | 1/2008 |

OTHER PUBLICATIONS

International Search Report and Written Opinion for International Patent Application No. PCT/US2013/040600 mailed Jul. 25, 2013.
International Search Report and Written Opinion dated Jul. 25, 2013 in related application PCT/US2013/040600.

* cited by examiner

*Primary Examiner* — Nafiz E Hoque
(74) *Attorney, Agent, or Firm* — Brian M. Mancini

(57) ABSTRACT

An apparatus and method for initiating a voice communication to a best-determined target includes associating a plurality of workers in a worker list with a skills profile for each worker. Upon receiving an assistance request for a task, the worker list can be searched automatically for target contacts having the skill profile best-matching the assistance request. Further search criteria can be compared between the task and the matched target contacts to facilitate the proper selection of the best-matched target contacts. Upon a match, a voice communication is automatically initiating between the requestor to the best-determined target contact.

16 Claims, 3 Drawing Sheets

AUTOMATED VOICE CONNECTION TO A BEST-DETERMINED TARGET

FIELD OF THE DISCLOSURE

The present disclosure relates generally to communication systems and more particularly to a system that automatically directs a voice connection to a best-determined target.

BACKGROUND

There are many occasions where a worker needs to contact a co-worker or other person who has the best skill set or knowledge to assist that worker. Determining the contact target who has the "best" skill set or knowledge to assist the worker can depend on many factors including the target's: recorded skill set, authority, availability, location, language skills, priority, etc.

A general solution to this problem is to provide a list of people of the workplace that is stored in a database with each person's particular skill set or knowledge profile recorded in the database, whereupon a worker that requests specific information or other assistance can submit this to a server of the database to search for the target contact that is best suited to provide that assistance. In one solution, connecting to a target contact person with the best skill set match is mediated manually by a central dispatch service that can search the database for people with the required skills or capabilities, and then calling these people to see if they are available to the worker requesting the assistance, which may require much time and several calls to finally provide the desired result, if ever. Another solution is to provide an accessible database with a search function so that a person seeking another with a particular skill set or knowledge profile can look up these skills in the database to find the correct person, whereupon the requesting person can then contact this person on their own. In either case, there is additional manual processing and/or messaging that is required, which is time and labor intensive.

Accordingly, there is a need for a technique to automatically connect a requestor by voice to a best-determined target contact. It would also be of benefit to automatically provide an ordered list of alternate target voice connections if a connection cannot be made to the best target for whatever reason. It would be of further benefit, if the voice communication could be made without using an external telephone system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
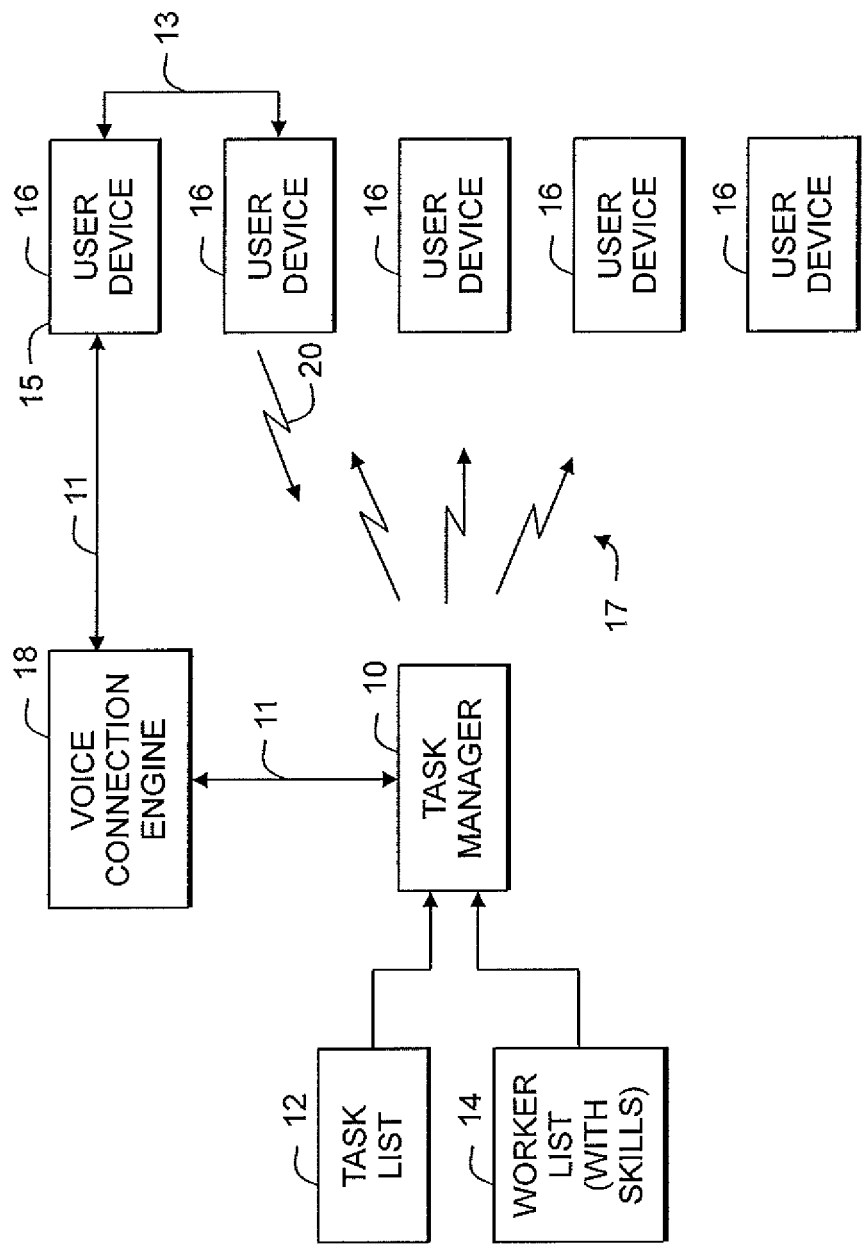
FIG. 1 is a simplified block diagram of a system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a technique for a requestor to be connected automatically by voice to a best-determined target contact person. In addition, the present invention can automatically provide an ordered list of alternate target voice connections if a connection cannot be made to the best target for whatever reason. The present invention can accomplish the voice connection over a local area network communication system, using a peer-to-peer Voice over Internet Protocol (VoIP) approach for example, thereby bypassing an external telephone system and the associated charges.

In practice, workforce management must deal with a huge number of in-store tasks which occur every day. The tasks tend to be very dynamic and scheduling them across the workforce is the primary function of workforce management. There are two general scheduling approaches to workforce dispatching: reactive—tasks are associated with workers as workers become available, where the association takes into account a large number factors, but only uses the task (queue) and logged in user list information; predictive—current tasks and predicted future tasks (delivery truck arriving for unload in fifteen minutes) as well as projects worker staffing are taken into account to create a best working plan. In both cases, it is a dynamic environment and the assignments and plans are reviewed continuously to ensure that new requirements are being handled appropriately.

Reactive task dispatching addresses existing work requirements. In a retail store, there are always things to do. Whether it is helping shoppers, cleaning, restocking, adjusting product presentation or doing inventory, there is always something to do. The workforce management task queue reflects this, with a huge backlog of prioritized tasks. The workforce management system will ensure that the competing tasks are pursued in an order that aligns with business needs. For reactive task dispatching, task assignments are re-evaluated as things change. The specific changes of interest are: change in worker availability or attributes/skills, tasks added/deleted from queue, and tasks changing state.

For a newly created task, the dispatching goes through the following layers: "could do"—who could do a particular task? To pass this filter the worker would need to have the correct attributes and skills, "should do"—the group of workers is winnowed based on task priorities and availability/interruptability threshold. If the new task isn't more important than what everyone is already doing, then the resulting "should do" list would be empty and the task will remain in the queue and be dispatched at the appropriate opportunity. If there is a list of people that should do this new task instead of their current task, then there will be an attempt for one of these people to switch to the new task, "order of appropriateness"—this sorting can look at skill level, equipment already in-hand, location, fairness (recent number of interruptions), closeness to deadline, and opportunity cost of tying up in-demand skills, "contact"—a limited number of the most appropriate people will be contacted. Workers will continue to be contacted until the task is fully staffed, or we run out of workers to contact. (If we run out of workers, then the task is enqueued and will likely be staffed by when an appropriate person finishes their current task and asks for a new one.

When a worker finishes a task and requests a new one, in concept the dispatching goes through the following layers: "could do—what tasks could this person do? To pass this filter the person would need to have the correct attributes and skills, "should do order"—the tasks they should do are ordered according to priority and how good a match they are for this—mostly skill level, equipment already in-hand and department. The person is presented with the most appropriate task(s), which could be one task or a list of tasks depending on company policies. The actual sets of skills/attributes/departments/roles are determined by the organization using the task management solution. Only the organization knows what attributes are appropriate to manage and summon staff appropriately.

The embodiments described herein automatically route a voice communication to an appropriate target contact, in response from a request for assistance or knowledge from a requesting person, i.e. a requestor. A target contact person is selected from a workforce database containing skill sets and capabilities of people of the workforce. The skill sets are pre-stored and can be dynamically modified as skill sets change. The requestor can send a request for assistance that includes pre-defined or requestor-defined parameters that are recognized by the task manager as indicating particular information. The task manager uses these parameters to first search the database for people having matching skill set for the requested assistance. The actual target contact selected to perform the assistance, and subsequently to call, also depends on other criteria, such as that contact's availability, location information that relates to the desired assistance, the authority of the target contact and/or the requestor, the target contact language skills, task priority, previously assigned tasks for that target contact, and their priority, etc. These criteria can be weighted in order for the task manager to select the most appropriate person(s) to contact to perform the assistance.

FIG. 1 depicts an example system and environment utilizing the present invention. In a typical workforce management environment a task manager 10 is utilized to help coordinate the many tasks that are part of a large store's daily operation, for example. The task manager 10 can load a list of tasks 12 to be accomplished periodically. The task list 12 can also include task priorities and deadlines, and can include requirements specifying the type of worker who can complete the task.

The task manager 10 will also obtain a list of workers 14 to be used to accomplish the tasks from the task list 12. The worker list 14 includes the skill sets and capabilities of each worker. For example, the worker list 14 includes a list of workers currently on duty and a specific set of worker attributes (skills, capabilities, physical characteristics, responsibility, etc.). The worker list 14 can also include some real-time information about each worker (like location, current assignment, number of interruptions the user has already experienced, priority of task, etc.).

The workforce management system, and particularly the task manager 10 is responsible for queuing tasks appropriately and matching up tasks to workers such that the workers are kept productive on tasks appropriate to their capabilities and tasks get done in with the appropriate level of urgency.

Each worker is carrying an assigned user device 16 that allows them to receive their current task assignments 17. The user devices could also have the capability to interact with the task manager to indicate their progress against their task assignment. The user device could be virtually any IEEE 802.11 device that has a screen and allows simple user interaction. Although this task manager interaction with the worker might incorporate recorded voice for hands free operation, the interaction is primarily visual, via a screen and buttons. If the user devices are only used to assign tasks, they do not need to have audio connection functionality in order to accomplish their assigned tasks.

However, in accordance with the present invention, it is preferred that the user devices 16 include voice communication functionality. Moreover, it is preferred that the user devices include a help button or function on a task display screen to request assistance so that a worker can reach out and get interactive voice help if they run into problems with a task. Inasmuch as the task manager already includes worker skill sets and capabilities, it is well suited to direct the voice connection to the proper person to provide the requested assistance. To support the help button or function, a task carries an independent set of search criteria that is used by the task manager to provide an ordered list of people to contact for interactive voice help by a voice connection engine 18. In effect, the task manager knows what task was sent to the user device, and upon receipt of a request for assistance 20, the task manager will know to use the search criteria for that task to search for people who can assist with that task. It should be noted that this search criteria used to select people to provide assistance will be different than the task criteria used to originally select a worker to perform the task. The helpers providing the assistance will be more senior and have more experience than the typical worker, i.e. they will have a higher, more responsible skill set.

It is also envisioned that one of the user devices could be a customer kiosk, interactive call button, or cell phone application, for example, where a customer could select a help button or function on the device to request to speak to someone with a particular knowledge base. Similarly, an associate could request assistance from their device to talk to an expert to provide assistance in solving a customer problem. As a result, the best target selection capability of the present invention can be used outside the task management system using independent search criteria. In particular, the requestor can enter text or a voice command for the desired assistance, such as "need assistance at the service desk for a customer who speaks Spanish". This text is sent to the task manager processor which can implement a search engine to search the skill sets of the workforce in the database to find the best target contact. In this example, the task manager could recognize the word "Spanish", and possibly "speaks", as belonging to a skills category, and "service desk" as belonging to a defined location using natural language processing, or the attributes could come in as name/value pairs such as: LANG=Spanish, SERVICE_DESK=true. The task manager could then search for workers with this language skill and location, and then initiate a voice connection to the indicated target contact to respond to this request for assistance.

In the example shown in FIG. 1, a worker performing a task may find that they are having a problem completing the task. The worker can activate the help function of their user device to send a request for assistance 20 to the task manager. Using the search criteria for that corresponding task, the task manager can provide an ordered list of best target contacts who can provide assistance for that task. The task manager can select the first (i.e. best contact or most expert) person in the list and direct a voice connection engine to contact that person, e.g. device 15. The target contact can answer the voice connection to directly respond to the requestor for the purposes of acknowledgment or for further instruction. If that best contact answers the call, that expert 15 could talk to the requestor directly using a peer-to-peer connection 13. Alternatively, the call could be relayed 11 between user devices via the voice connection engine and possibly the task manager. If the best contact fails to answer, the task manager can select the next contact in the ordered list to try to establish a voice connection, and so on.

Figure 2:
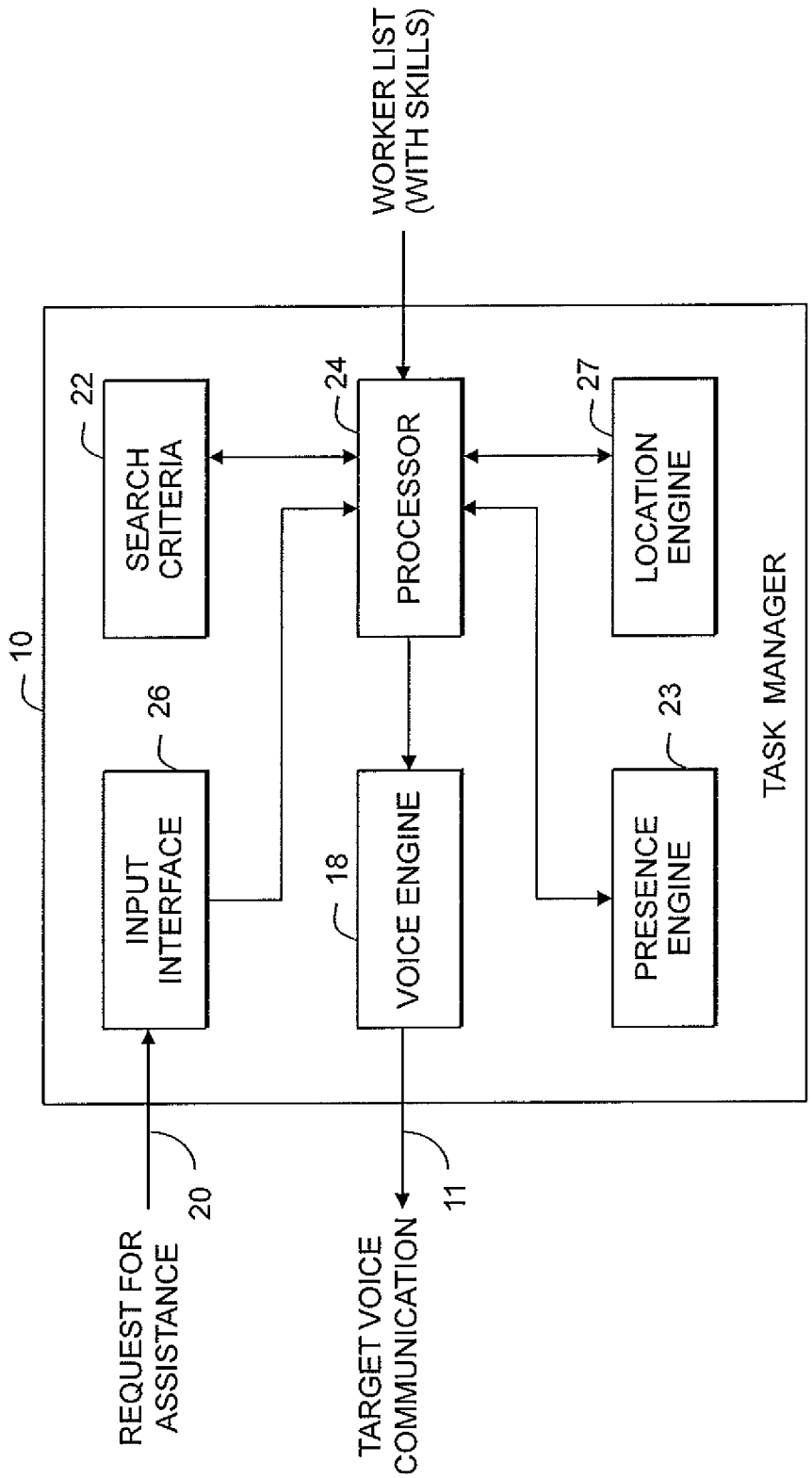
FIG. 2 is a simplified block diagram of a task manager in accordance with an embodiment of the present invention.

FIG. 2 depicts an embodiment of the present invention for a workforce task manager 10. The task manager can be wholly incorporated with a local area network communication server, for example. Such a server and network may be utilized in a retail, factory or warehouse environment, in some examples, to provide private communications. The network serves a workforce wherein everyone has a registered skill set that is stored in the worker list, which is input into the task manager processor 24. Using the communication network, a person (requestor) can send a request for assistance 20 to the task manager. This request is received by an input interface 16 of the task manager. The processor 14 interprets the request and searches the skills sets of the workforce using the search criteria 22 for that task to select the best target person within the workforce to assist with the task, as will be detailed below. The processor can then direct the voice connection engine 18 to initiate and connect the requestor to the selected best target using voice communication. It should be noted that the voice connection engine could be part of the task manager as shown in FIG. 2 or could be a separate module as shown in FIG. 1.

The actual local area communication network of the task manager may include Ethernet interfaces for the task manager to communicate on the local area network. Also, the communication interfaces can be compliant to IEEE 802.11 and variants thereof); IEEE 802.16 (WiMAX or any other variation); Universal Mobile Telecommunications System (UMTS); Code Division Multiple Access (CDMA) including all variants; Global System for Mobile Communications (GSM) and all variants; Time Division Multiple Access (TDMA) and all variants; Direct Sequence Spread Spectrum; Frequency Hopping Spread Spectrum; wireless/cordless telecommunication protocols; wireless home network communication protocols; paging network protocols; satellite data communication protocols; wireless hospital or health care facility network protocols such as those operating in the WMTS bands; GPRS; and proprietary wireless data communication protocols such as variants of Wireless USB. It is envisioned that the present invention is operable without the use of a public switched telephone network, a cellular network, or other wide area network.

The search criteria can be stored in a memory including any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the task manger processor. The memory may be utilized to store data associated with skills sets of the workforce.

The processor may be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of operating the task manager. The processor generally provides the software, firmware, processing logic, and/or other components that enable functionality of the task manager.

It may be that several target contacts have the same skill set or that the ideal candidate is not available to perform the task. Therefore, the present invention also provides further search criteria for each target contact that can be weighted in order to select the target contact that is the best match for the requested assistance. These search criteria can be static or dynamically changed to suit the environment for the corresponding task. It is envisioned that the search criteria can include, but are not limited to: availability, location, the authority or responsibility level of the target contact, the target contact language skills, previously assigned tasks for that target contact, the priority of work presently being performed by the target contact, etc. Moreover the assistance request 11 from the requestor can include further parameters to compare to the search criteria such as: task priority, requestor authority, and time period to perform the task.

One search criterion can be a presence of a target contact. In particular, the task manager 10 can include a presence engine 23 that monitors the presence states of the workforce. As is known in the art "presence" can indicate more than just the availability of a target contact. Presence can also provide information regarding a state of the target activity. For example, presence states can include any one or more of the states of "available/not busy", "not available", "busy", "authority", etc. There are several known techniques for providing the presence of a target, and these will not be presented for the sake of brevity other than to mention that any of these techniques can be used equally well in the present invention. It should be noted that the present invention is broader than the existing concept of presence, and that detailed knowledge of presence, including interruptability and the relative importance of different peoples' activities is a natural result of people being managed by a task management system.

Another search criterion can be a location of a target contact. In particular, the task manager 10 can include a location engine 17 that monitors the locations of the workforce. The location can be provided in real-time or periodically stored. There are several known techniques for providing the location of a target, and these will not be presented for the sake of brevity other than to mention that any of these techniques can be used equally well in the present invention.

Another task criterion can be a task history stored in the memory. For example, where a previous assistance request was directed to a particular target contact, that same target contact could be weighted higher for any new assistance requests similar to the previous assistance request.

In accordance with the present invention, the processor 24 compares the search criteria for the corresponding task and the target contacts to provide an ordered list of best matches according to the search criteria and their weightings, the top match in the list being the best candidate. In particular, the processor will receive the assistance request 20 from the input interface 26. The assistance request can include relevant parameters (e.g. priority or requestor authority). The processor will then search for those people in the workforce who have skills matching the requested assistance. The processor then has a resulting list of matched target contacts. The list of matched target contacts is then ordered in response to task criteria and their respective weightings to provide an ordered list. The processor then directs the initiation of voice communication with the target contacts in the order of the list until contact is made with a target contact. The voice communication can be performed using a decentralized peer-to-peer communication system, which can be accomplished using a Voice over Internet Protocol, for example.

Weightings can best be compared in various general ways. In one example, the search criteria to be compared includes determining a presence state for each of the matched target contacts from the list, wherein if a presence state shows that a target contact is not available for voice communication, that target contact is removed from the list. In another example, the task criteria to be compared includes an authority value for the requestor and each of the matched target contacts, wherein each target contact is provided a weighting value proportional to $L_{atc}/L_{ar}$, where $L_{atc}$ is the authority level of the target contact and $L_{ar}$ is the authority level of the requestor. In another example, the search criteria to be compared includes a spoken language of the matched target contacts, wherein if spoken language of any target contact does not match an assistance request parameter of the requestor, that target contact is removed from the list.

In another example, the search criteria to be compared includes a task priority from the requestor indicated in the assistance request parameters, wherein the search criteria are provided a weighting value proportional to the task priority. Similarly, the search criteria to be compared includes a priority of a duty being performed by the target contacts, where targets contacts performing higher priority duties are given a lower weighting, i.e. inversely proportional to the task priority. Further, the task priority and duty priority can also be compared, where those targets doing a higher priority duty than the requested task priority are removed from the list.

In the scenarios described herein, it may be that a substantial amount of the workforce has the matching skills necessary for the requested assistance. Therefore, the list of matched targets contacts can be quite large. However, weighted task criteria can be used to narrow down the list. For example, those matched target contacts that are "available/not busy" would be given a higher weighting. Those matched target contacts that are "busy", but doing a lower priority task, would be given a higher weighting. Those matched target contacts that are "busy", and doing a higher priority task than the task requesting assistance, would be removed from the list. In addition, those matched target contacts who have a location that is closer to the requestor would be weighted higher than those who are farther away from that location. Also, those matched target contacts who have a lower authority or responsibility level would be weighted lower than those who have a more experience or responsibility. Further, those matched target contacts who have been previously assigned for assistance with that task would be weighted higher than those who have not. Moreover, if parameters of the assistance request indicate than the requestor has rated the task a higher priority, or that the requestor has a higher authority, the weightings can be globally increased higher, thereby overriding priority for some people who may not have been included in the list due to being busy in other tasks.

In any of the above scenarios, if a target contact does not answer the voice communication, acknowledge the voice communication, or does not assist within a defined time period from the assistance request, the task manager can determine who else is available, such as through the use of the presence engine, and create and send a message for the first contact from the order list that the presence engine indicates as becoming "available/not busy" or completing a higher priority task. The message can be voice or text, and could simply direct the target contact to call back the requestor to provide assistance.

Figure 3:
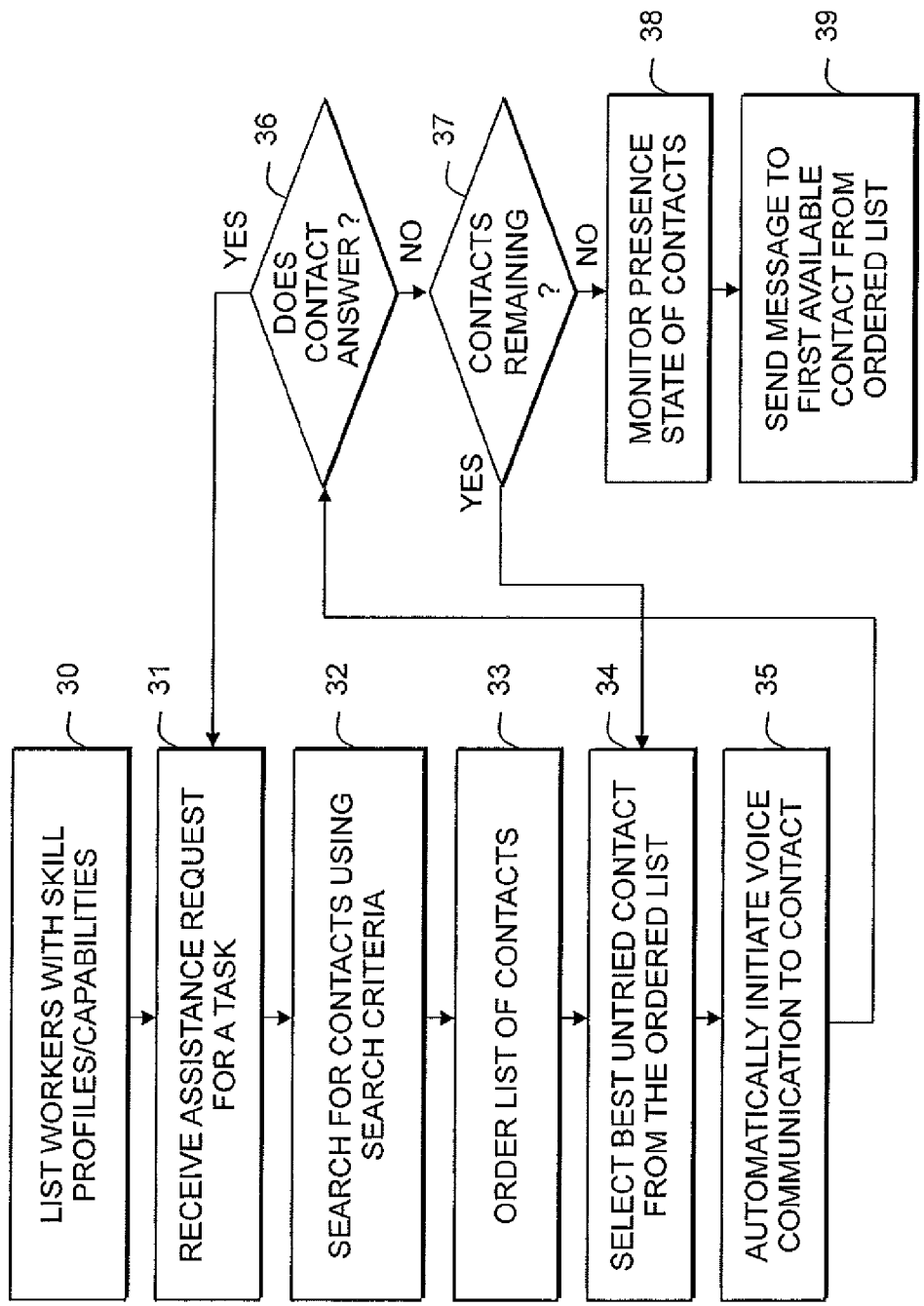
FIG. 3 is a simplified flow chart of a method in accordance with an embodiment of the present invention.

As shown in FIG. 3, the present invention also provides a method for initiating a voice communication to a best-determined target contact in response to a request for assistance, comprising a first step 30 of listing a plurality of workers of a workforce in a worker list, with a skills/capabilities profile for each worker.

A next step 31 includes receiving a request for assistance from a requestor. This request can be a general request or a specific request for a task currently being performed by the requestor. The request can optionally including at least one parameter identifying a desired skill or knowledge.

A next step 32 includes automatically searching the skills profiles in the worker list for target contacts having the skills profile best-matching the at least one parameter and/or search criteria associated with the corresponding current task needing assistance. Each search criteria can be weighted so that they can best be compared in various general ways. In one example, the search criteria to be compared includes determining a presence state for each of the matched target contacts from the list, wherein if a presence state shows that a target contact is not available for voice communication, that target contact is removed from the list. In another example, the task criteria to be compared includes an authority value for the requestor and each of the matched target contacts, wherein each target contact is provided a weighting value proportional to $L_{atc}/L_{ar}$, where $L_{atc}$ is the authority level of the target contact and $L_{ar}$ is the authority level of the requestor. In another example, the search criteria to be compared includes a spoken language of the matched target contacts, wherein if spoken language of any target contact does not match an assistance request parameter of the requestor, that target contact is removed from the list. In another example, the search criteria includes a priority of a current task of a matched target contact and a priority of a current task of the requestor, wherein if the priority of the current task of the matched target contact exceeds the priority of the current task of the requestor, that target contact is removed from the list. In another example, a task priority from the requestor can be indicated in an assistance request parameter, wherein the assistance request is provided a weighting value proportional to the task priority. In another example, a priority of a duty being performed by each matched target contact can be compared, where the assistance request is provided a weighting value inversely proportional to the priority of the duty. It should be noted that the search criteria for the request for assistance used to select people to provide assistance for a task will be different than the task criteria used to originally select a worker to perform the task. In particular, the selected matched target contact to provide the assistance will be more senior and have more experience than the typical worker, i.e. they will have a higher, more responsible skills set for that task than the worker (requestor) performing the task.

A next step 33 includes producing an ordered list of matched target contacts arranged in order of best matches according to the search criteria and weightings, the best match being first in the list.

A next step 34 includes selecting the best-determined, as so far untried, matched target contacts from the ordered list.

A next step 35 includes automatically initiating a voice communication from the requestor to the selected target contact from the ordered list. If the initiation step fails 36 (i.e. the target contact does not answer), then the method checks if there are other untried candidates in the ordered list 37, and if so selects the next best candidate 34, and tries to automatically initiating a voice communication 35 from the requestor to the next untried target contact from the ordered list. However, if there are no target contacts left in the ordered list that have not been tried 37, the method further comprises monitoring 38 a presence state availability of the matched target contacts from the ordered list, and creating and sending 39 a message for the first available matched target contact from the ordered list to call back the requestor.

It is envisioned that the method of the present invention can be performed within a local area communication network task manager.

Advantageously, the present invention combines a text-oriented task system with a peer-to-peer voice communication system. The resulting combination is configured to provide automatic voice communications to a requestor needing assistance with a task. Parameters and search criteria are defined to provide the optimal selection of a target contact to provide a desired assistance. As a result the present invention provides reduced assistance latency than prior art systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method within a retail store for initiating a voice communication to a best-determined target, comprising the steps of:

listing, by a task manager in the store, a plurality of workers of the store in a worker list with a skills profile for each worker;

receiving a request for assistance from a requestor in the store;

automatically searching, by the task manager, the skills profiles in the worker list for target contacts having the skills profile best-matching search criteria associated with the corresponding request needing assistance;

producing, by the task manager, an ordered list of matched target contacts in order of best matches according to the search criteria;

selecting, by the task manager, the best-determined matched target contact from the ordered list based in part on a current activities of the target contacts and a relative importance of those activities as determined by the task manager;

automatically initiating a voice communication between the requestor and the selected target contact from the ordered list in a communication over a local area network communication system bypassing an external communication system; and wherein the search criteria of the searching step includes an authority level for the requestor and each of the matched target contacts, wherein each target contact is provided a weighting value proportional to $L_{atc}/L_{ar}$, where $L_{atc}$ is the authority level of the target contact and $L_{ar}$ is the authority value of the requestor.

2. The method of claim 1, wherein the search criteria of the searching step includes determining a presence state for each of the matched target contacts from the ordered list, wherein if a presence state shows that a target contact is not available for voice communication, that target contact is removed from the ordered list.

3. The method of claim 1, wherein the search criteria of the searching step includes a spoken language of the matched target contacts, wherein if spoken language of any target contact does not match an assistance request parameter of the requestor, that target contact is removed from the list.

4. The method of claim 1, wherein the search criteria of the searching step includes a task priority from the requestor indicated in an assistance request parameter, wherein the assistance request is provided a weighting value proportional to the task priority.

5. The method of claim 1, wherein the search criteria of the searching step includes a priority of a duty being performed by each matched target contact, where the assistance request is provided a weighting value inversely proportional to the priority of the duty.

6. The method of claim 1, wherein the search criteria of the searching step includes; a priority of a current task of a matched target contact and a priority of a current task of the requestor, wherein if the priority of the current task of the matched target contact exceeds the priority of the current task of the requestor, that target contact is removed from the list.

7. The method of claim 1, wherein if the initiation step fails, checking if there are other untried candidates in the ordered list, and if so selecting the next best candidate, and automatically initiating a voice communication from the requestor to the next untried target contact from the ordered list.

8. The method of claim 7, wherein if the initiation step fails and there are no available target contacts left in the ordered list, further comprising monitoring a presence state availability of the matched target contacts from the ordered list, and sending a message for the first available matched target contact from the ordered list to call back the requestor.

9. The method of claim 1, wherein the search criteria for the request for assistance used to select people to provide assistance is different than task criteria used to originally select a worker to perform the task, in that the selected best-determined target contact to provide the assistance has a higher skills set for that task than the requestor.

10. A task manager within a retail store for initiating a voice communication within the retail store, comprising:
a worker list associating a plurality of workers of the store with a skills profile for each worker;
an input interface operable to receive a request for assistance from a requestor in the store;
a processor operable to: automatically searching the skills profiles in the worker list for target contacts having the skills profile best-matching search criteria associated with the corresponding request needing assistance; produce an ordered list of matched target contacts in order of best matches according to the search criteria; and select the best-determined matched target contact from the ordered list based in part on a current activities of the target contacts and a relative importance of those activities as determined by the task manager;
a voice connection engine coupled to the processor, wherein, upon direction from the processor, the voice connection engine is operable to automatically initiate a voice communication between the requestor and the selected target contact from the ordered list in a communication over a local area network communication system bypassing an external communication system; and
wherein the search criteria of the searching step includes an authority level for the requestor and each of the matched target contacts, wherein each target contact is provided a weighting value proportional to $L_{atc}/L_{ar}$, where $L_{atc}$ is the authority level of the target contact and $L_{ar}$ is the authority value of the requestor.

11. The task manager of claim 10, wherein the search criteria are weighted based a recent number of interruptions to provide fairness in an arrangement of the ordered list.

12. The task manager of claim 10, wherein the search criteria are weighted and the weighted criteria are used in arranging the ordered list in order of best matches.

13. The task manager of claim 10, further comprising a presence engine operable to determine a presence state of the matched target contacts, the presence state being one of the search criteria.

14. The task manager of claim 10, further comprising a location engine operable to determine a location of the matched target contacts, the location being one of the search criteria.

15. The task manager of claim 10, wherein the worker list can include a history of tasks performed by the matched target contacts, the history being one of the search criteria.

16. The task manager of claim 10, wherein the search criteria for the request for assistance used to select people to provide assistance is different than task criteria used to originally select a worker to perform the task, in that the selected best-determined target contact to provide the assistance has a higher skills set for that task than the requestor.

* * * * *